J. CROWE.
AUTOMATIC CHAIN BELT MAKING MACHINE.
APPLICATION FILED AUG. 31, 1917.
1,295,441.
Patented Feb. 25, 1919.
8 SHEETS—SHEET 1.
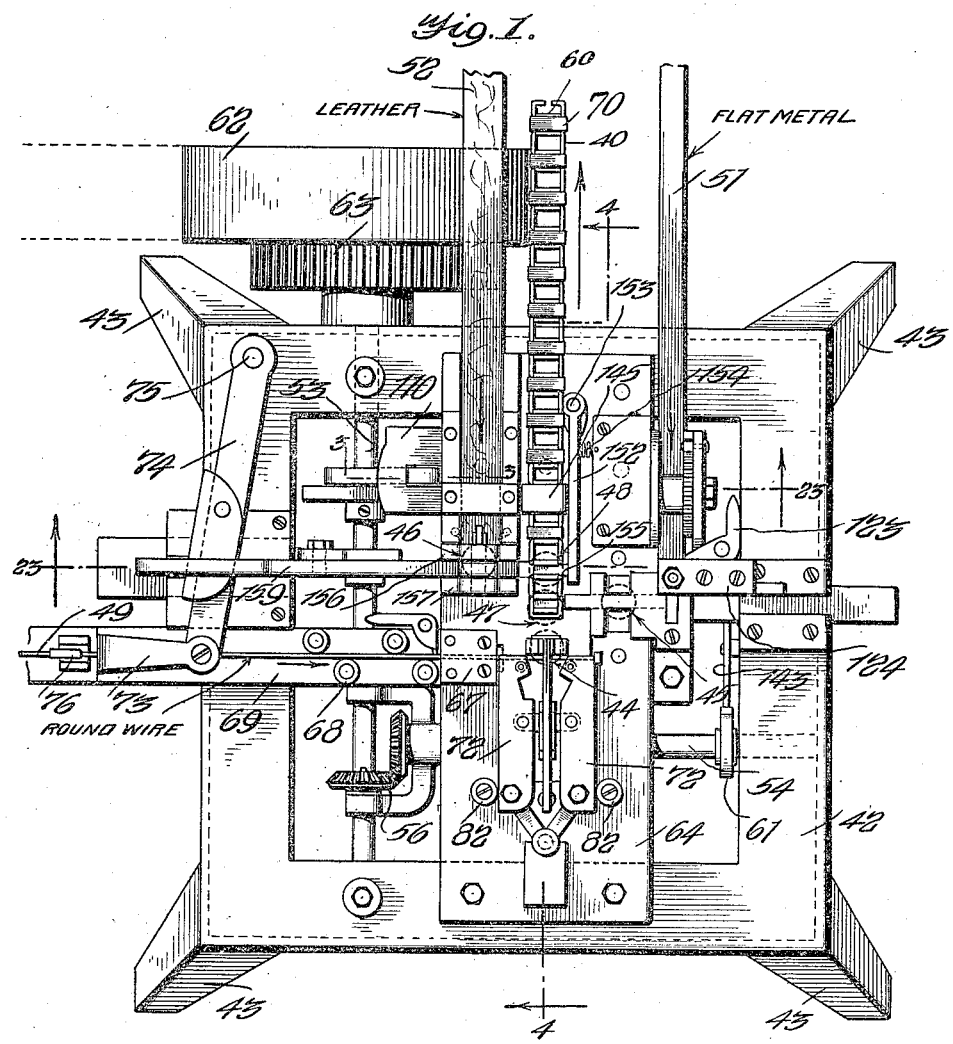
Fig. 1.
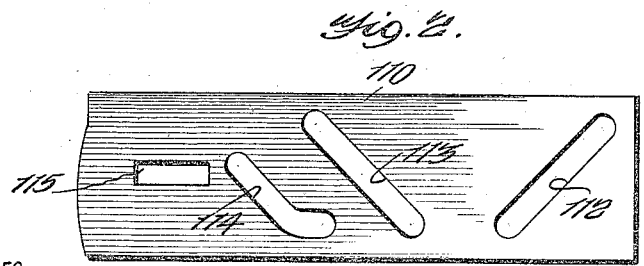
Fig. 2.
Fig. 3.
WITNESSES
INVENTOR
JOHN CROWE,
BY
ATTORNEYS

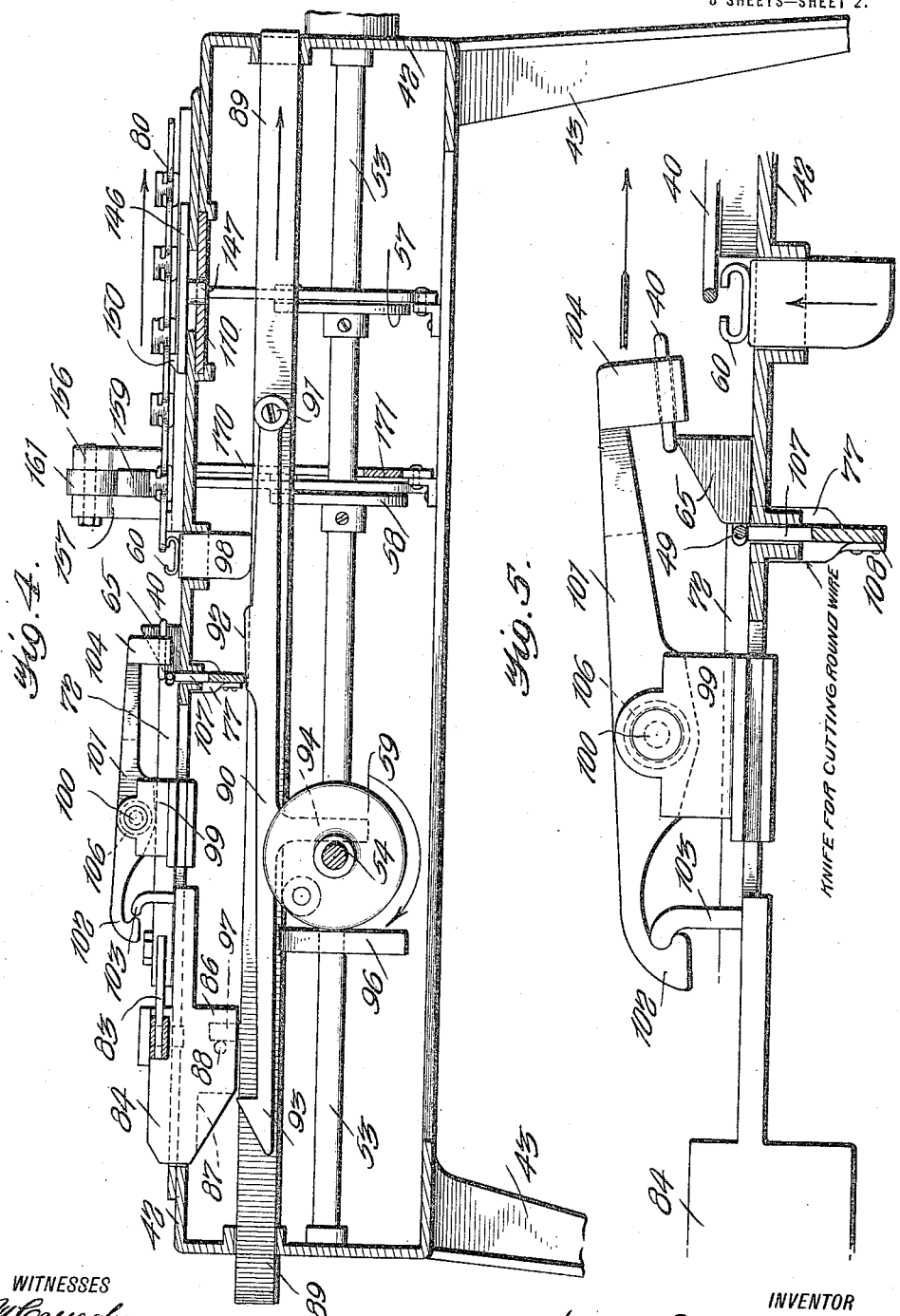

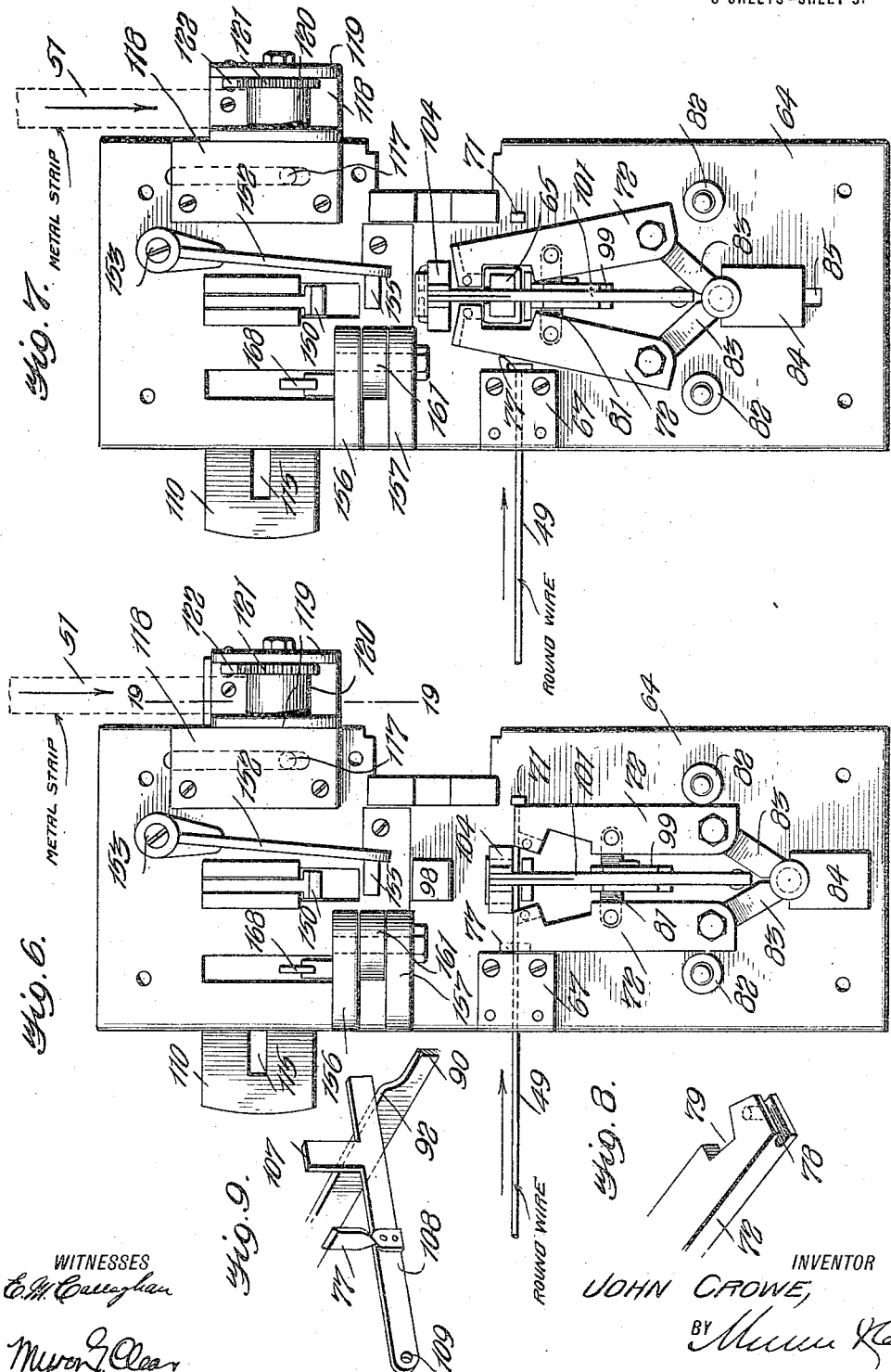

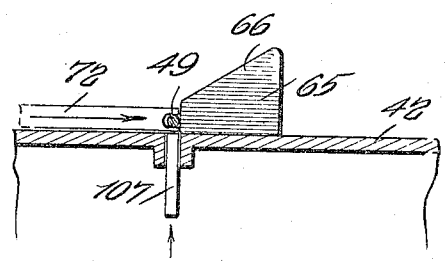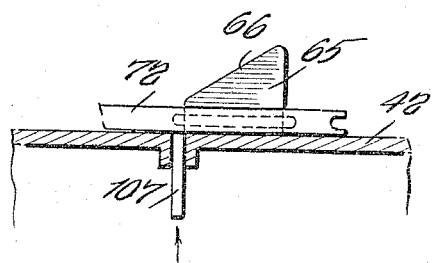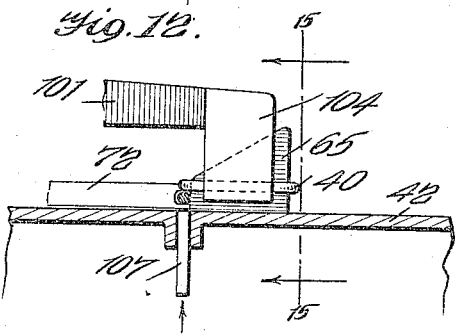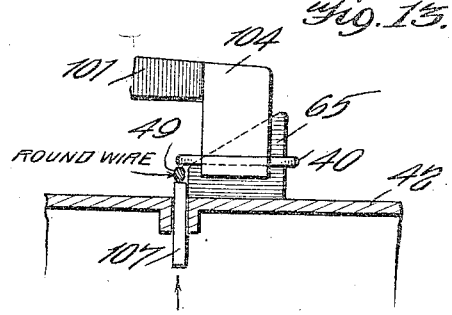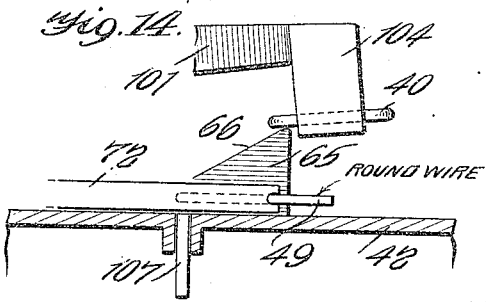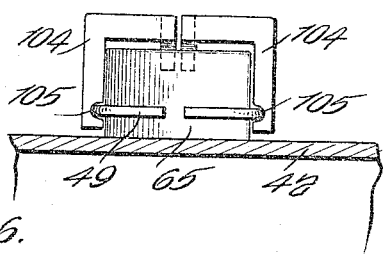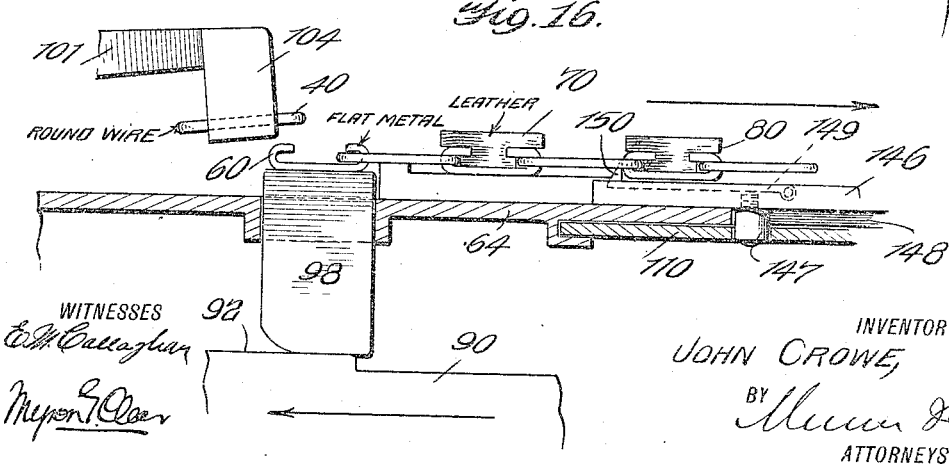

J. CROWE.
AUTOMATIC CHAIN BELT MAKING MACHINE.
APPLICATION FILED AUG. 31, 1917.
1,295,441.
Patented Feb. 25, 1919.
8 SHEETS—SHEET 5.
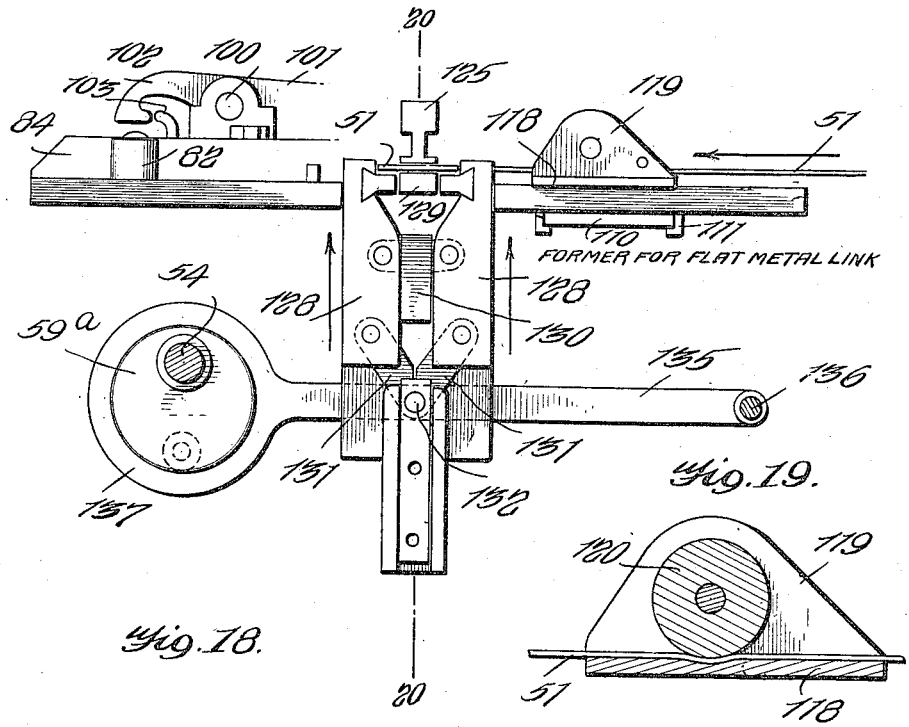
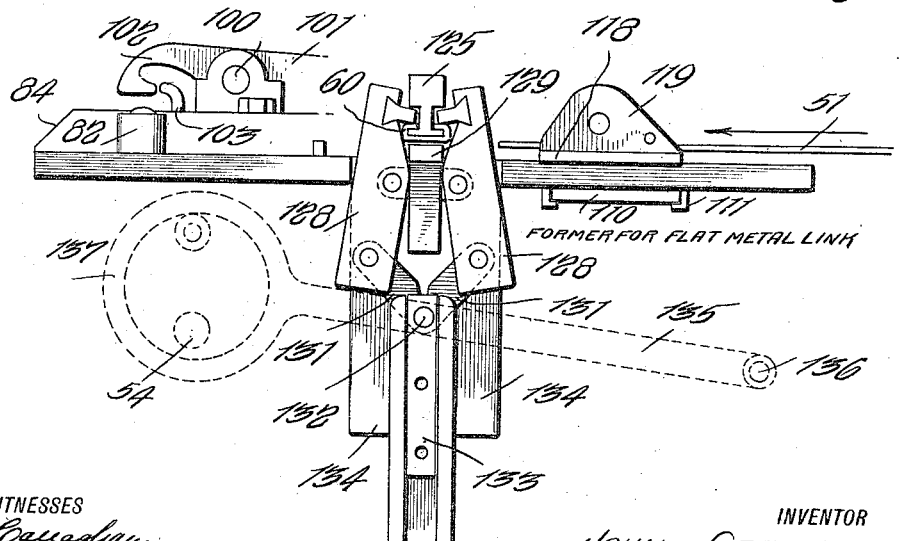

J. CROWE.
AUTOMATIC CHAIN BELT MAKING MACHINE.
APPLICATION FILED AUG. 31, 1917.
1,295,441.
Patented Feb. 25, 1919.
8 SHEETS—SHEET 6.
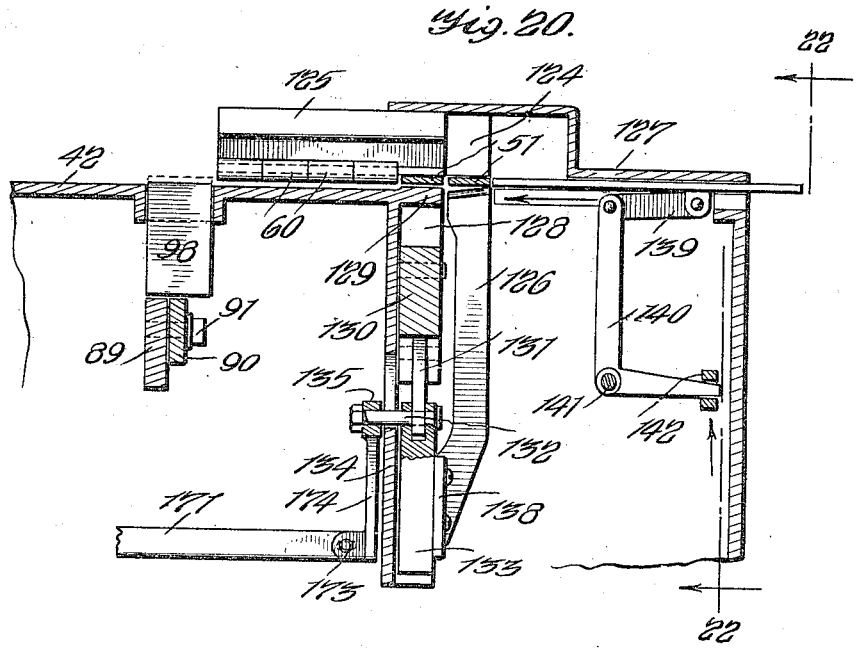
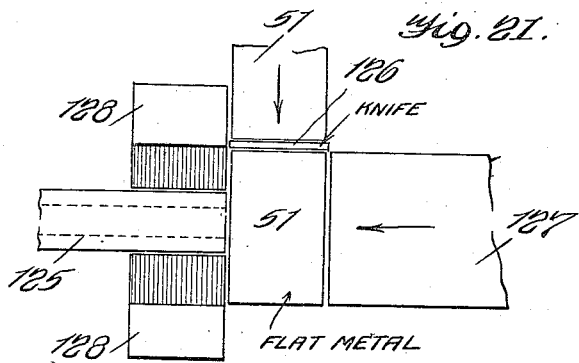 
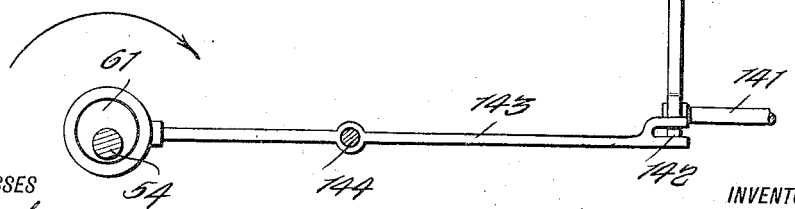
WITNESSES
INVENTOR
JOHN CROWE,
BY
ATTORNEYS J. CROWE.
AUTOMATIC CHAIN BELT MAKING MACHINE.
APPLICATION FILED AUG. 31, 1917.
1,295,441.
Patented Feb. 25, 1919.
8 SHEETS—SHEET 7.
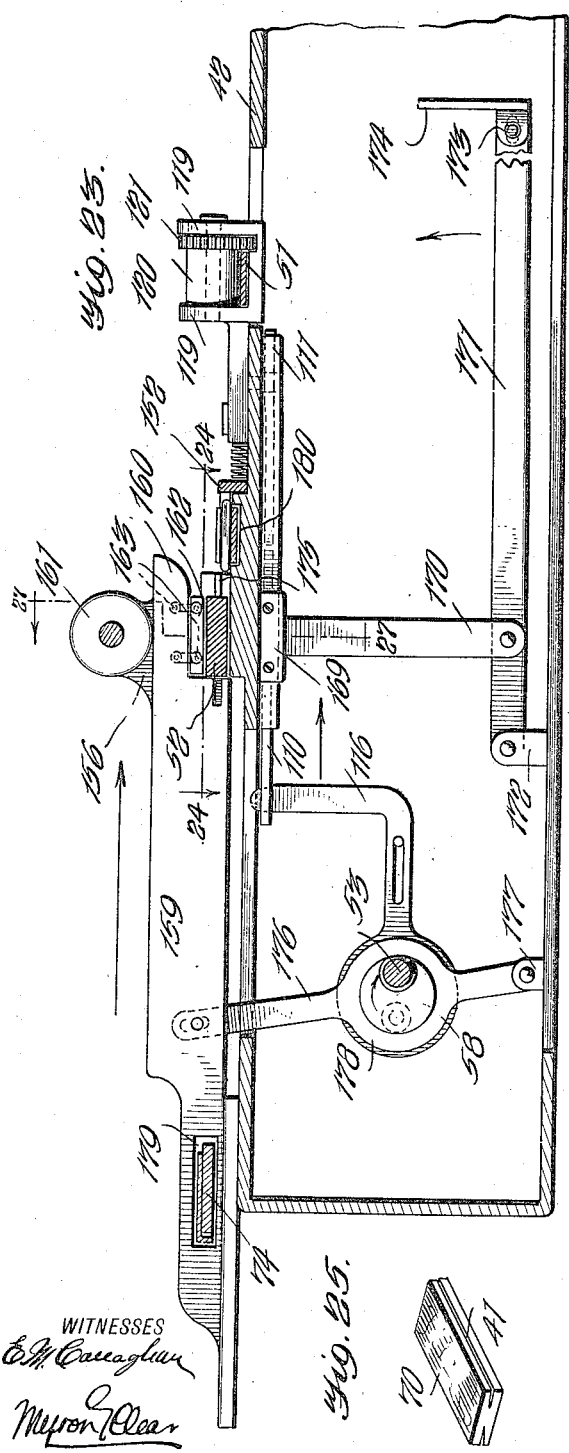
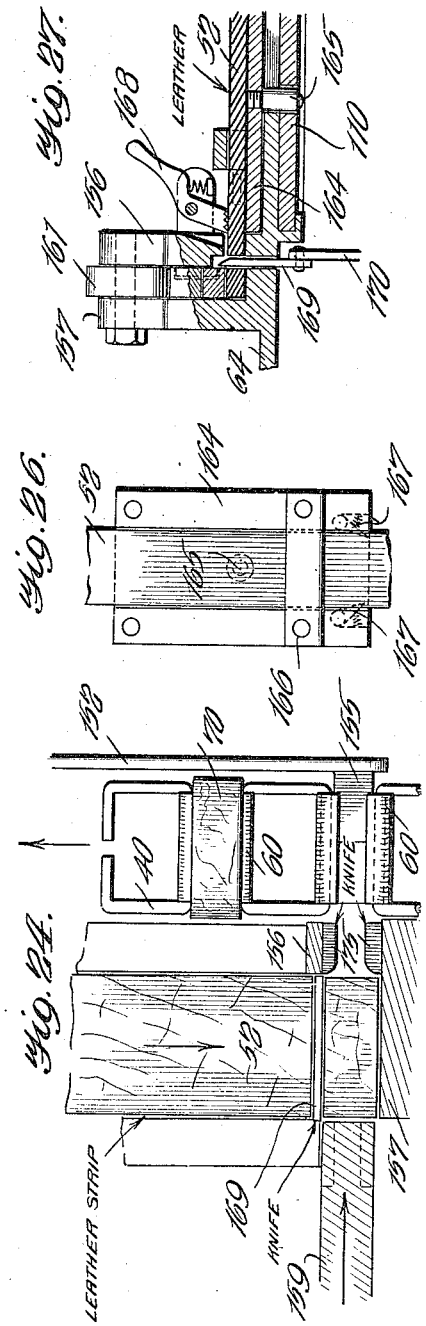
WITNESSES
INVENTOR
JOHN CROWE,
BY
ATTORNEYS

J. CROWE.
AUTOMATIC CHAIN BELT MAKING MACHINE.
APPLICATION FILED AUG. 31, 1917.

1,295,441.

Patented Feb. 25, 1919.
8 SHEETS—SHEET 8.

WITNESSES

INVENTOR
JOHN CROWE,
BY
ATTORNEYS

UNITED STATES PATENT OFFICE.

JOHN CROWE, OF ST. JOSEPH, MISSOURI, ASSIGNOR TO MECHANICAL BELT COMPANY, OF ST. JOSEPH, MISSOURI, A CORPORATION.

AUTOMATIC CHAIN-BELT-MAKING MACHINE.

1,295,441.   Specification of Letters Patent.   Patented Feb. 25, 1919.

Application filed August 31, 1917. Serial No. 189,131.

*To all whom it may concern:*

Be it known that I, JOHN CROWE, a citizen of the United States, and a resident of St. Joseph, in the county of Buchanan and State of Missouri, have invented an Improvement in Automatic Chain-Belt-Making Machines, of which the following is a specification.

My present invention relates generally to machines for manufacturing chain belts, and particularly to a machine for manufacturing belts of the nature described and claimed in my Patent No. 1,194,962, dated August 15, 1916. The belt in question, which it is the main object of my present improvements to manufacture continuously and automatically, is formed of alternately arranged and interengaging open and closed links, the open links being formed substantially rectangular of wire and the closed links being formed in substantial U-shape with inturned extremities within which certain of the sides of the open links are engaged, the belt being completed by means of the leather or other traction blocks driven into the closed links and carried by the latter in such manner as to lock the open and closed links in their engaged relation.

It is obvious, therefore, that in providing a machine for the purpose of manufacturing a belt of this nature four operations are necessarily provided for, first the formation of the open links, second the formation of the closed links, third the formation of the traction blocks, and fourth the assembly of these parts in the complete belt.

In my present improvements, as will be hereinafter described, the assembly of the formed parts is in turn divided, the open and closed links being first assembled at one point and the formed traction blocks driven into the engaged links at another point.

Bearing in mind, as above stated, that its primary object is the provision of a machine operating automatically toward the desired end, various other objects and the advantages of my invention will appear in the course of the following description, taking up in turn the mechanism bringing about the operations stated, and referring throughout to the several figures of the accompanying drawings, forming a part of this application.

My invention, therefore, resides generally in the features of construction, arrangement and operation which I will now proceed to make plain.

In the accompanying drawings:

Figure 1 is a top plan view of the complete machine.

Fig. 2 is a detail plan view of the slide plate controlling feed movements of the leather and flat metal and outward movement of the finished belt.

Fig. 3 is a detail vertical section taken substantially on the line 3—3 of Fig. 1, through the leather feeding parts.

Fig. 4 is a vertical sectional view through the machine, taken substantially on the line 4—4 of Fig. 1.

Fig. 5 is an enlarged detail of a portion of Fig. 4.

Fig. 6 is a top plan view of the bed plate removed, with the parts carried thereby, illustrating the open link forming device in retracted position.

Fig. 7 is a similar view with the open link forming parts in a forward position.

Fig. 8 is a detail perspective view of the forward operating extremity of one of the open link forming levers.

Fig. 9 is a detail perspective view of the wire cutting and open link lifting member.

Figs. 10 to 14 inclusive are sectional side views illustrating in detail the several steps in the formation and discharge of one of the open links.

Fig. 15 is a detail sectional view taken substantially on the line 15—15 of Fig. 12.

Fig. 16 is a detail sectional view illustrating the manner in which the open and closed links are assembled.

Fig. 17 is an elevation of certain parts of the closed link forming means, with the forming levers in lower inactive positions.

Fig. 18 is a similar view with the forming levers in upper active positions.

Fig. 19 is a detail vertical section through the feed slide of the metal strip.

Fig. 20 is a detail vertical section taken substantially on the line 20—20 of Fig. 17.

Fig. 21 is a plan view of certain of the parts of the closed link forming means.

Fig. 22 is a vertical section taken substantially on the line 22—22 of Fig. 20.

Fig. 23 is a vertical sectional view taken substantially on the line 23—23 of Fig. 1.

Fig. 24 is a sectional plan view through the traction block forming and assembling means substantially on the line 24—24 of Fig. 23.

Fig. 25 is a detail perspective view of one of the formed traction blocks before assembly.

Fig. 26 is a detail plan view of the leather feed slide.

Fig. 27 is a detail vertical section taken substantially on the line 27—27 of Fig. 23.

Figure 28:
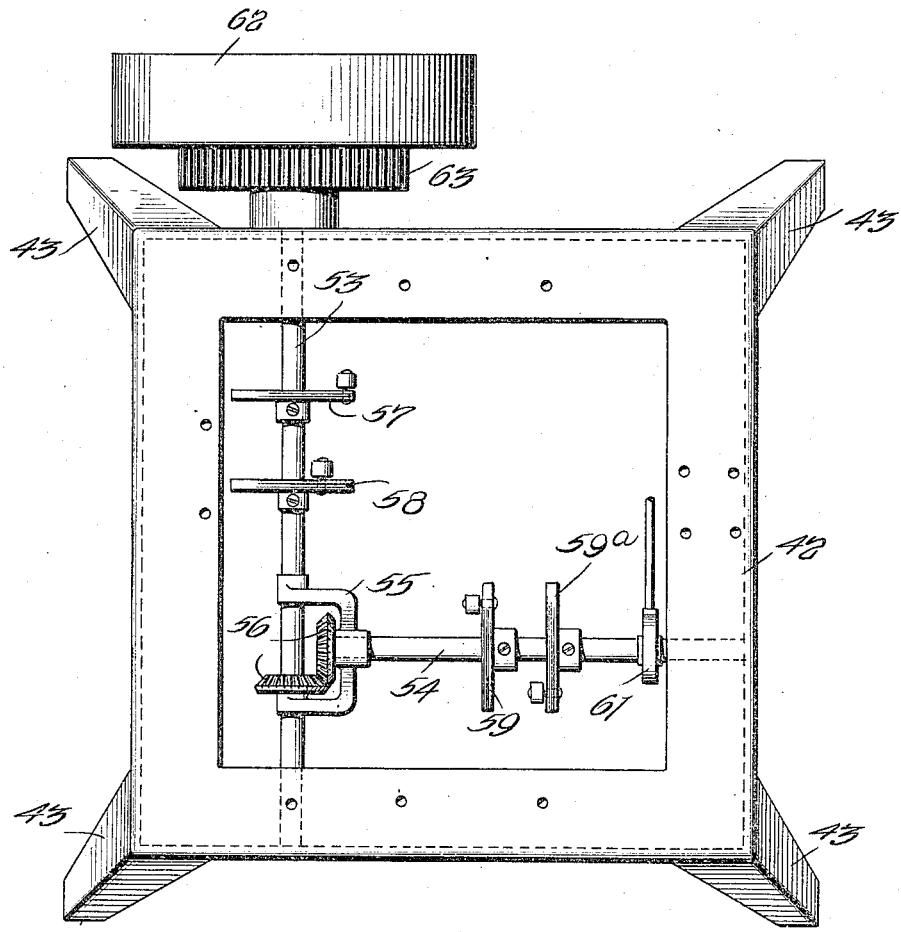

Fig. 28 is a plan view of the frame and driven parts of the machine with the bed plate and operating parts removed.

Figure 29:
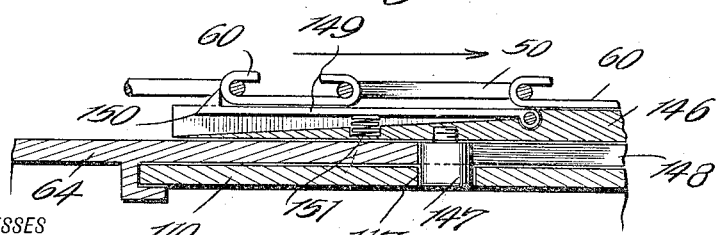

Fig. 29 is an enlarged detail sectional view through a portion of the belt shifting means by which the formed belt is moved as the parts are assembled.

Referring now to these figures, particularly to Fig 1, it is believed that by a short general description of the several operations to be brought about by the machine in the manufacture of the belt, probably better understood by a comparison of Figs. 24, 25 and 29, the several constructions to be later described will more plainly appear.

Each of the open links 40 of the belt is formed of a single section of wire, bent to the rectangular shape best seen in Fig. 4, with the extremities, adjacent one another and at one of the sides of the open link, engaged within the inturned extremities of the adjacent U-shaped flat metal links 60, which are known as closed links, and between the extremities of the latter of which their thus exist spaces, as best seen in Fig. 29, into which the traction blocks 70 are driven, the latter having side grooves 41, as clearly seen in Fig. 25, so as to provide for the reception of the extremities of the closed links and the extension of portions of the traction blocks into the closed links adjacent the engaged side portions of the open links, whereby to prevent displacement of the open links thereafter, it being, of course, evident that the traction blocks provide the necessary tractive surface of the belt, beyond their functions as locks for the open and closed links in their engaged relation, and that their presence in the completed belt admits of free flexing movements of the open and closed links.

Again referring to Fig. 1, the frame of the machine is shown generally at 42, its upper rectangular portion being supported in elevated position upon legs 43, and it is upon this upper rectangular portion of the frame that the several operating parts are mounted and the several operations to be now generally described are carried out. Thus the open links are formed at a station indicated by the dotted circle 44, the closed links are formed at a station indicated by the dotted circle 45, the traction blocks are formed at a station indicated by the dotted circle 46, the closed links being shifted laterally from the station 45 and the open links being shifted in a direction at right angles to the shifting movements of the closed links, the latter with their extremities turned uppermost in order that the open links may be dropped onto the same at a link assembling station indicated by the dotted line 47. With the open and closed links in connection with one another, the belt, as such, is capable of being shifted in the direction of the arrow along the completed section of the belt in Fig. 1, and the formed traction blocks are fed laterally and forced into the spaces of the closed links at a station indicated by the dotted circle 48.

In Fig. 1 the completed belt is indicated at 80, moving in the direction of the arrow, and the wire, flat metal strip and leather strip, 49, 51 and 52, respectively, are fed into the machine, as shown, in the directions of the arrows, respectively, along the same.

Referring now to Fig. 28, it will be noted that a pair of shafts 53 and 54 are suitably mounted at right angles to one another, within the portion 42 of the frame, the latter being connected to the former by a journal bracket 55 and by intermeshing bevel gears 56, so as to provide for the simultaneous rotation of the shafts, shaft 53 having cams 57 and 58 at spaced points, and shaft 54 having cams 59—59$^a$ and an eccentric 61 at spaced points.

Shaft 53 is driven from any suitable source of power through a belt connection leading to its pulley 62, or by gearing connections engaging its gear 63.

Above and across the upper rectangular portion 42 of the frame is a bed plate 64, as best seen in Figs. 4, 6 and 7, upon which, at an intermediate point, is secured the open link forming die 65 having an upper beveled face 66, for a purpose which will appear in the description in connection with Figs. 10 to 14 inclusive, the bed plate 64 having at one side of said die 65 a wire guiding block 67 through which the inner portion of the wire 49 extends, after its passage between the guide rollers 68 of its guide plate 69, the wire 49 being fed intermittently across the bed plate 64 at the rear of the die 65 in lengths extending from the guide block 67 to a rigid stop 71, as plainly seen in Fig. 6 in which one full feed length of the wire is shown, at the forward ends of the link forming levers 72.

These feed movements of the wire 49 are brought about at the proper intervals by a wire engaging feed member 73 at one end of a lever 74, the opposite end of which is pivoted at 75 upon the upper portion 42 of the frame, the said engaging member 73 operating to engage the wire upon its inward movements and being shiftable freely with respect to the wire in its outward movements. A wire clutch 76 is mounted at the outer end of the wire feed plate 69 designed to grip the wire in one direction and prevent retractile movements thereof during the outward movement of the engaging feed member 73.

Each section of the wire 49 fed across the bed plate 64 and against the stop 71, is cut off at a point immediately adjacent one side of the guide block 67 by means of a knife 77 and its portions lying upon opposite sides of the forming die 65 extend into the grooves 78 at the forward ends of the open link forming levers 72, the said grooved ends of which are recessed at 79 at their inner faces so that upon their forward movement from the position shown in Fig. 6, the end portions of the cut section of wire are bent around the die 65 in view of the relatively shifting movements of the forming levers, as now described.

These forming levers 72, which most plainly appear in Figs. 6 and 7, are intermediately connected by pivots to the outer ends of a transverse strap 81, pivotal connections of which form fulcrums upon which the forward ends of the two levers are shiftable toward one another when their recesses 79 are opposite the sides of the die 65, in order to bend the extremities of the cut section of wire toward one another. During their initial forward movements to the position shown in Fig. 6, the levers 72 move in parallelism with their rear ends between guide rollers 82 mounted on the bed plate 64 and beyond which it is necessary for the levers to proceed before their relative shifting movement just above described.

At their rear ends the two levers 72 are pivotally connected by means of links 83 to a shifting block 84 movable upon the upper surface of the bed plate 64, and portions of which depend through the bed plate slot 85, which depending portions appear at 86 in Fig. 4, having an undercut shoulder 87 and a laterally projecting pin 88.

Beneath the bed plate 64, a slide bar 89 is horizontally movable through the upper portion 42 of the frame, as seen in Fig. 4, at one side of the vertical plane of the cam 59, said slide bar having a vertically shiftable actuating bar 90 pivotally mounted at 91 thereon, and thus shiftable therewith, said actuating bar having an intermediately upwardly extended portion 92 forming a cam and provided at its free end with an upwardly projecting hook 93 positioned outwardly beyond the undercut shoulder 87 of the shifting block 84. The actuating bar 90 also has an intermediate depending arm 94 with which the roller of cam 59 is engageable to shift the said bar and the slide bar 89 in the direction of the arrow in Fig. 4, said roller of said cam being also engageable with the under surface of the actuating bar 90 to lift the latter into engagement with the block 84 previous to such horizontal shifting movement.

The slide bar 89 has a laterally projecting and depending arm 96 spaced from the arm 94 of the actuating bar 90 against which the roller cam 59 engages to shift the two bars horizontally in the reverse direction, during which latter movement the block 84 is shifted rearwardly by virtue of an upwardly projecting arm 97 on the slide bar 89, which engages the laterally projecting pin 88, before mentioned.

It is obvious that the actuating bar 90 will in the course of the movement thereof under actuation of the roller of the cam 59 drop for passage of the roller from a position beneath the same, so that its disengagement from the block 84 is thus brought about at the end of the stroke of the latter, the slide bar 89 and actuating bar 90 continuing their movement, whereby to project the cam 92 of the said actuating bar beneath the lower end of an elevating block 98, as seen in Fig. 4, vertically shiftable at the station 47 of Fig. 1, where the open and closed links are joined.

The strap 81 connecting the forming levers 72 before described, is mounted in connection with a slide member 99 seen in Figs. 4 and 5, and having upwardly projecting portions supporting bearings for the intermediate fulcrum 100 of a link shifting lever 101, at the rear thereof, which has a depending hook 102 arranged to be engaged by a forwardly projecting hook 103 at the forward end of the block 84, disposed between the rear portions of the forming levers 72.

The forward end of this lever 101 is bifurcated, and its side portions have depending laterally spaced engaging fingers 104 capable of downward movement at opposite sides of the die 65 to the position shown in Figs. 12, 13 and 15, said side portions 104 having inner recesses 105 in which the side portions of a formed open link are received when the lever is retracted with the retractile movement of the forming levers 72. When an open link has been formed in a manner previously described around the die 65 and the parts are retracted, the forward link engaging end 104 of the lever, which is normally held in lowered position by a spring 106 around its fulcrum 100, is drawn rearwardly at the sides of the die 65, so as to engage the formed link, and when the parts again start forward in the formation of a subsequent link, the formed link engaged by the lever 101 in its upward movements upon the inclined face 66 of the die lifts the forward end of the lever 101 against the tension of spring 106, and lowers its rear hook 102 into engagement with the hook 103 of the block 84. Thus the lever 101 will be held in the position shown in Fig. 5 as long as the block 84 and strap 81 move in unison, but in view of the laterally swinging movements of the forming levers 72 the block 84 has a slightly longer stroke than the strap 81 and thus at the proper time the hook 103 will be moved out of engagement with the hook 102, so as to allow the forward end 104 of the lever 101 to drop out at a point above the elevating block 98, which latter is then elevated to the position shown in Fig. 16 by virtue of the engagement of cam 92 below is lower end. At the time the elevating block 98 is lifted a closed link is disposed thereon, and thus elevated therewith, one side of the closed link engaging the open link of the formed portion of the chain, and the other side engaging the open link carried by the then lowered end of lever 101. Thus, when the lever 101 is again retracted with the other parts, the open link previously carried thereby is pulled out, this action being not only due to the retractile movement of the lever 101, but also to the advancing or feed movement of the formed part of the chain as presently described.

During the retractile movement of the lever 101, with the block 84 and the open link forming means, and subsequent to its engagement with the formed open link, the latter is shifted vertically, in order to provide for its free sliding movement up the inclined face 66 of the die 65, by a vertically movable link shifting member 107, which as shown in Fig. 9, is an upright extension of a lever 108 extending at right angles to the slide bar 89, one end of which lever 108 is pivotally supported at 109 and the opposite free end of which rests upon the cam 92 of the actuating bar 90.

Thus, referring to Figs. 10 to 14, inclusive in succession, the severed portion of the wire is first engaged by the forming levers 72, as in Fig. 10, the said severed section of the wire bent around the die 65, as seen in Fig. 11; a new severed section is fed in upon retraction of the forming levers; the previously formed link is elevated by vertical movement of the shifting link 107, as seen in Fig. 12, and during the bending of the second section around the die, as seen in Fig. 14, the previously formed link then engaged by the link shifting lever 101 is shifted free of the die and forwardly above the link assembling station 47 of Fig. 1.

Laterally beneath the bed plate 64 an actuating slide plate 110 is shiftable in guides 111, this plate having angular slots 112, 113 and 114, and also having a slotted opening 115 adjacent one end, to receive the upper end of an angular shifting arm 116, seen in Fig. 23, actuated by the cam 57 of the shaft 53. The angular slot 112 adjacent the opposite end of the plate 110 receives the depending pin 117 of a sliding feed bracket 118 upon the base of which the inner portion of the flat metal strip 51 is disposed as seen in Figs. 19 and 23, said bracket 118 having upright portions 119 supporting the shaft of a roller 120, the latter having a ratchet wheel 121 and a bracket having a pawl 122 in engagement with the ratchet wheel to prevent the latter from rotating and cause the same to grip the metal strip 51 when the bracket is shifted inwardly. During outward movement of the bracket the roller 120 is free to rotate so as to move with respect to the metal strip 51, which latter is held against retractile movement by the engagement of one end of a sharpened lever 123 with the side of the strip.

Referring now to Fig. 17, the movement of the bracket 118 shifts the inner portion of the strip 51 beneath the guide 124 seen in Figs. 1 and 20, and across the lower outer portion of a closed link die 125, of Figs. 17 and 18, at which point the section of the proper length is severed by a vertically movable knife 126, seen in Fig. 20. The metal section so severed is shifted laterally by a horizontally movable shifting plate 127 to a point beneath the outer end of the die 125, around the lower portion of which the strip is bent into the form of the closed link by the vertically movable forming levers 128, which latter are of similar construction to the wire link forming levers 72 before described.

As will be seen by a comparison of Figs. 17 and 20 for instance, the closed link die 125 is of considerable length so as to retain a series of the closed links 60 upon its lower flanged portion, the inner end of the die terminating adjacent one side of the elevating block 98, so that the last link of the series formed on the die is shifted therefrom and upon the elevating block as each severed length of the strip 51 is shifted beneath the outer end of the die 125 by the shifting plate 127. At its station beneath the outer end of the die 125, each severed section of the strip 121 rests upon an extension 129 of the bed plate 64 between the upper ends of the levers 128, the latter of which are connected integrally at their ends by a strap 130, the pivoted ends of which form fulcrums for the said levers, upon which their upper ends may swing inwardly to bend the extremities of the closed links, as seen in Fig. 18. The lower ends of the levers 128 are connected by links 131, which latter are connected by a pivot pin 132 to the upper end of a vertical slide bar 133, the pivot pin 132 extending laterally through a slot in the vertical extension 134 of the bed plate as seen in Fig. 20 on which extension 134 the levers 128 are shiftable. The pin 132 connects slide 133 to a rocker arm 135 intermediate the ends of the latter.

The rocker arm 135 is pivotally mounted at 136 at one end as seen in Fig. 17, and has an integral ring 137 at its opposite end engaged by the roller of the cam 59ª of shaft 54, so that the arm 135 and subsequently the forming levers 128 are thus shifted vertically during operation.

By reference to Fig. 20 it will be noted that the strip severing knife 126 is carried by a plate 138 secured to the vertical slide bar 133 before mentioned, so that as each of the severed sections of the strip is bent upwardly around the outer end of the die 125 through the action of the forming levers 128, another section of the strip is severed at a point outwardly offset from the levers, in order that during each lowering movement of the levers the shifting plate 127 will act to shift a severed strip in operative position above the forming levers.

The slide plate 127 is connected by a link 139 with the upper end of a bell crank lever 140, mounted upon a stub-shaft 141 and having its arm 142 acted upon by the free end of a lever 143 fulcrumed intermediate its ends at 144 and acted upon at its opposite end by the eccentric 61 of shaft 54. Thus at the proper times the free end of the lever 143 is elevated against the arm 142 of the bell crank 140 so as to rock the latter and shift the plate 127 inwardly for the purposes above mentioned.

It is obvious from the foregoing that as each closed link is formed the inner link of the series of closed links sliding on the die 125 is deposited on the outer end of the elevating block 98 in the position shown in Fig. 16 for elevation into engagement with the spaced open links, one of which is carried by the inner end of the formed belt and the other by the engaging members 104 at the inner end of the open link shifting lever 101.

Referring again to Fig. 1, it will be noted that the formed portion of the chain is carried outwardly beneath the guide 145, the belt extending over a sliding plate 146 as seen in Fig. 29, having a roller 147 depending through a slot 148 of the bed plate 64 and into the intermediate angular slot 113 of the shifting plate 110. The belt shifting plate 146 is movable inwardly without effect upon the belt, means being provided, however, for its engagement with the belt so as to shift the latter outwardly upon each outward movement of the slide. These means are shown in Fig. 29 where the plate 146 is seen provided with a horizontally extending pivoted arm 149, the free end of which has a hook 150 engageable at one side of each of the closed links 60, the arm 149 being engaged by a spring 151 carried by the plate 146 so as to normally shift the hook upwardly into engaged position.

Thus the hook 150 is engaged with the adjacent closed link and the plate 146 moves outwardly immediately following the elevation of each of the closed links into engagement with spaced open links, as seen in Fig. 16, this action, as well as the retractile movement of the lever 101 serving to disengage the shifted open link from the latter.

Alongside the formed chain and disposed substantially parallel therewith is a positioning lever 152 pivoted at its outer end at 153 and acted upon by a spring 154 to normally shift the same toward the finished section of the belt, the free end of the aid positioning lever having a laterally projecting positioning block 155 which, as best seen in Fig. 24, finds its way into each of the closed links at one side of the chain opposite that side from which the traction blocks 70 are forced into the closed links, the positioning member being disposed with its link entering block 150 in aline with the movement of the traction blocks so as to thus hold the closed link in proper position.

At that side of the finished section of the chain opposite the positioning lever 152, are a pair of uprights 156 and 157 between which the inner end of a block feeding slide 159 is shiftable, said slide having an overhanging forward extension 160 shiftable beneath a roller 161 mounted in bearings on the upright plates 156 and 157. The overhanging extension 160 provides for the support of a swinging pressure block 162 connected thereto by vertically disposed links 163, said block being parallel with and below the lower face of said extension and normally held in forward position, so that when it shifts upon its links 163 on engagement with the upper face of each traction block, it is shifted downwardly by the straightening out of the links and pressed tightly against the upper faces of the traction blocks, it being intended that the lower face of the said block 162 shall be slightly curved so as to thus impart curvature by pressure to the outer face of each traction block, in order that the latter may be shaped to conform to the crown and contour of pulleys in connection with which the completed belts are intended for operation.

The wall 156 just above mentioned, is slotted at its lower portion in order to receive the inner end of the leather strip 52, the latter of which is intermittently fed inwardly by means of a horizontally shifting feed plate 164 movable on a portion of the belt bed plate 64, before described, and provided with a depending roller 165 extending through a slot in the bed plate and into the angular slot 114 of the shifting plate 110. The strip 52 as seen best in Fig. 26, passes beneath a cross bar 166 of its feed slide 164 and its side edges are engaged by spring controlled spurs 167 so as to force the leather strip inwardly with inward movements of the said feed slide, the upright wall 156 before mentioned having a spring actuated pawl 168, as seen in Fig. 27, engaging the inner end of the leather strip 52, so as to prevent retractile movement of the latter with the retractile movement of the feed slide.

Thus, upon each inward movement of the feed slide 164 the leather strip is shifted inwardly to project its inner end across the space between the walls 156 and 157 and consequently across the forward end of the feed bar 159. When the leather strip reaches this position a vertically reciprocating knife 169 operating in a vertical slot in the bed plate 64, as seen in Fig. 27 to sever the strip in the plane of the inner surface of the wall 156. This knife 169 is secured to the upper end of an upright 170, the lower end of which is pivotally connected intermediate the ends of a connecting bar 171. This connecting bar 171 is pivoted at one end upon a stationary bracket 172 and is connected at its opposite end by a pin and slot connection 173 to the lower end of an arm 174, depending from the rocker arm 135, before described as seen in Fig. 20.

As a result of each vertical movement of the knife 169, it is thus apparent that the traction block is severed and rests freely between the walls 156 and 157 forwardly of and below the forward end of the reciprocating feed bar 159, so that upon inward movement of the latter the block is forced laterally and into the closed link 60 held in alinement therewith by means of the positioning lever 152.

By reference to Figs. 23 and 24 in particular, it will be noted that the inner portions of the walls 156 and 157 in a space between the chain and the leather strip 52, are provided with horizontally disposed knives 175 projecting into the path of movement of each of the traction blocks with the feed bar 159 so that the sides of each traction block will be grooved as indicated at 41 in Fig. 25 to accommodate the inner free edges of the closed links 60.

It will be obvious that in forcing each traction block into the adjacent link of the chain from the position shown in Fig. 24, the positioning block 155 will be thrust outwardly against the tension of its spring 154, and will be held outwardly until outward movement of the chain slide plate 146 brings about the next outward shifting movement of the chain.

To the traction block feed bar 159 is loosely connected the upper end of an actuating lever 176, the lower end of which is pivotally mounted upon a stationary bracket 177, said lever having an intermediate integral ring 178 engaged by the roller of the cam 58 of shaft 53 so as to bring about the movement of the feed bar. By reference to Fig. 23 it will also be noted that the outer end of the traction block feed bar 159 has a slot 179, through which the wire feeding lever 74 extends intermediate the ends of the latter, whereby to bring about the feed movements of the wire 49 during movement of the said bar. It will also be noted that inwardly beyond its shifting slide 146, the assembled links of the finished belt rest upon a portion of the bed plate 64, which has, as best seen in Fig. 23, a shallow recess in line with the feed bar 159 of at least the depth of the thickness of the closed or sheet metal links so that the sides of the latter will have a strong and rigid bearing against one side of the said feed table recess 180 when the traction blocks are forced laterally into the closed links.

It is believed that the construction of the several parts constituting the present machine, the operation of these, and their joint operation for the several purposes first above mentioned, have now been made plain, and that it is obvious from this full description of the construction, functions and movements of the parts that a belt of the type in question may be conveniently, automatically, and speedily manufactured without waste of material, and without the necessity of employing skilled mechanics for the purpose.

It is equally obvious that various changes and modifications may be made in the several parts of the machine as to the detatils in construction thereof, and without mentioning specific changes it is desired to retain all such that fall within the spirit of the invention and the scope of the appended claims.

I claim:

1. A chain belt machine comprising link forming means, link assembling means for forming a chain, means for forming traction blocks, and means for feeding the traction blocks into the assembled links to form the complete belt.

2. A chain belt machine comprising link forming means, means for assembling the links to form a chain, means for forming traction blocks, means for inserting the traction blocks within the assembled links, and connections continuously operating to actuate the several parts.

3. A chain belt machine comprising separate link forming mechanism forming links of different characteristics, means for assembling the links formed thereby, means for forming traction blocks engageable in the links formed by one of the said mechanisms, and means for feeding the formed traction blocks into the links after their assembly.

4. A chain belt machine comprising means for forming wire links, means for forming metal links, means for assembling the wire and metal links to form a chain, means for forming traction blocks, and means for feeding the traction blocks into the metal links after assembly of the links.

5. In a chain belt machine, the combination of chain forming means, means for forming links conveying gripping ends, means for intermittently moving the chain, and means for forcing traction blocks into the chain at spaced points in the length thereof and within said gripping link ends, during the intervals between the several movements of the chain.

6. In a chain belt machine, the combination with chain forming and feeding means, means for forming traction blocks, and means for feeding the traction blocks into the chain at spaced points, said means operating at right angles to the path of movement of the chain.

7. In a chain belt machine, the combination with chain forming and feeding means, means for forming traction blocks, and means for feeding the traction blocks into the chain at spaced points, said feeding means including a reciprocating feed bar engaging the traction blocks at the forward end thereof.

8. In a chain belt machine, the combination with chain forming and feeding means, means for forming traction blocks, and means for feeding the traction blocks into the chain at spaced points, said means including a feed bar engaging the traction blocks and having means for applying pressure to the said traction blocks for shaping the surface thereof.

9. In a chain belt machine, the combination with chain forming and feeding means, means for forming traction blocks, and means for feeding the traction blocks into the chain at spaced points, said means including a traction bar engaging the traction blocks and having an overhanging extension at its forward end provided with a pressure block engageable with the upper surfaces of the traction blocks.

10. In a chain belt machine, the combination with chain forming and feeding means, means for forming traction blocks, and means for feeding the traction blocks into the chain at spaced points, said means including a reciprocating feed bar engageable with the traction blocks adjacent its forward end and having an overhanging forward extension, and a pressure block having a link connection with the said extension and for engagement with the upper surfaces of the traction blocks for the purpose described.

11. In a chain belt machine, the combination with chain forming and feeding means, means for feeding traction blocks into the chain, and means for grooving the side edges of the traction blocks for the purpose described.

12. In a chain belt machine, the combination with chain forming and feeding means, means for feeding traction blocks into the chain, means for grooving the side edges of the traction blocks for the purpose described, and means disposed in the path of feed movements of the traction blocks for grooving the sides thereof.

13. In a chain belt machine, the combination with chain forming and feeding means, of means for forming traction blocks, means for feeding the traction blocks into certain links of the chain, and stationary grooving knives at opposite sides of the path of movement of the traction blocks to engage the latter as they are moved into the chain.

14. In a chain belt machine, the combination with chain forming means, means for intermittently moving the chain, means for feeding traction blocks into the chain at intervals between feed movements of the latter, and means engageable with the chain to hold certain links of the latter in alinement with the said feeding means.

15. In a chain belt machine, the combination with chain forming means, means for intermittently moving the chain, means for feeding traction blocks into the chain at intervals between feed movements of the latter, and means engageable with the chain to hold certain links of the latter in alinement with the said feeding means, said last-named means being shiftable out of engagement with the chain by each traction block as the latter is fed into the chain.

16. In a chain belt machine, the combination with chain forming means, of means for intermittently moving the formed chain, means for feeding traction blocks laterally into certain links of the chain, and means arranged at the opposite side of the chain with respect to the said feeding means, and engageable with the chain between movements of the latter, to hold the block receiving links in alinement with the said feeding means.

17. In a chain belt machine, the combination with chain forming means, of means for intermittently feeding the chain, link positioning means engageable with the chain between movements thereof to prevent accidental displacement of the chain, and means for feeding traction blocks into certain of the links of the chain so held.

18. In a chain belt machine, the combination with chain forming means, of means for intermittently feeding the chain, link positioning means engageable with the chain between movements thereof to prevent accidental displacement of the chain, and means for feeding traction blocks into certain of the links of the chain so held, said last-named means operating to shift the said positioning means out of engagement with the chain.

19. In a chain belt machine, the combination with chain forming means, of means for intermittently moving the formed chain, a spring controlled positioning lever pivoted at one side of the chain and having a link engaging block movable into certain of the links of the chain between movements of latter, and means operating at the opposite side of the chain to feed traction blocks laterally into the said links engaged by the block of said lever.

20. In a chain feeding machine, the combination of separate link forming mechanisms, a traction block forming mechanism, means for feeding wire to one of the link forming mechanisms, means for feeding a strip of flat metal to the other of said link forming mechanisms, means for feeding a strip of traction material to the traction block forming mechanism, means adjacent each of the link forming mechanisms for shifting the formed links therefrom, assembly means for joining the formed links, and means for feeding the formed traction blocks into certain of the links after their assembly.

21. In a chain belt machine, a chain forming mechanism including a separate link forming means, means for feeding wire to one of the link forming means, means for feeding a strip of metal to the other link forming means, means for shifting the formed wire links into juxtaposed relation adjacent the metal link forming means, and means for shifting the formed metal links laterally from the forming means vertically into engagement with the formed wire links.

22. In a chain belt machine, chain forming means including a pair of link forming mechanism, means for shifting the formed links from the said mechanisms in paths at right angles to one another, and means for assembling the formed links arranged substantially at the juncture of the paths of movement of the links from the said forming mechanisms.

JOHN CROWE.

Copies of this patent may be obtained for five cents each, by addressing the "Commissioner of Patents, Washington, D. C."